(12) United States Patent
Marshall

(10) Patent No.: US 10,060,117 B1
(45) Date of Patent: Aug. 28, 2018

(54) STORMWATER RUNOFF SEPARATOR AND COLLECTOR FOR CURB INLET TYPE CATCH BASINS

(71) Applicant: Ainsworth Marshall, Springfield, VA (US)

(72) Inventor: Ainsworth Marshall, Springfield, VA (US)

( * ) Notice: Subject to any disclaimer, the term of this patent is extended or adjusted under 35 U.S.C. 154(b) by 0 days.

(21) Appl. No.: 15/442,664

(22) Filed: Feb. 25, 2017

(51) Int. Cl.
*E03F 5/04* (2006.01)
*E03F 5/14* (2006.01)
(Continued)

(52) U.S. Cl.
CPC .............. *E03F 5/14* (2013.01); *C02F 1/004* (2013.01); *E03F 5/041* (2013.01); *E03F 5/046* (2013.01);
(Continued)

(58) Field of Classification Search
CPC ......... E03F 5/0401; E03F 5/041; E03F 5/046; E03F 5/12; E03F 5/14; E03F 2201/10; C02F 2103/001
(Continued)

(56) References Cited

U.S. PATENT DOCUMENTS

| 1,654,246 A | 12/1927 | Egan |
| 1,998,514 A | 4/1935 | Miller |

(Continued)

FOREIGN PATENT DOCUMENTS

| DE | 2648814 | * | 5/1977 |

OTHER PUBLICATIONS

Machine translation of DE 26 48 814 May 1977.*

*Primary Examiner* — Christopher Upton
(74) *Attorney, Agent, or Firm* — Ainsworth Marshall

(57) ABSTRACT

A hydraulic separation and collection system applicable to linear street curb-inlet type drainage-chambers, independent or connected to a storm drainage network. The FIRST FLUSH COLLECTOR™ is a pollutant separation and collection apparatus that can be integrated into an existing storm drain network, or be retrofitted as a component into a new or existing curb-inlet type drainage-chamber. The outfall from the FIRST FLUSH COLLECTOR™ can be redirected to a conventional stormwater pollutant BMP, or be diverted to a sanitary sewer, storm drain, or combined collection system for treatment downstream. The apparatus is envisaged as a simple, easy to install prefabricated-kit utilizing a basic build-in-place separation and collection apparatus. The apparatus can be readily adapted to the needs of a given curb-inlet type drainage-chamber with minor alterations to the chambers, or to the connected existing storm drainage network. The uniquely adaptative capability of the apparatus enables selective structuring based on the retrofitting requirements of a curb-inlet type drainage-chamber. The system is designed to handle a variety of ecosystem-contaminants, ranging from basic street-refuse and floatable objects, to coarse sediment, finer silt, and comparatively minute environmentally-hazardous petrochemicals, heavy-metals, phosphates, and nitrates. The system is design to refuse floatables and debris which will continue to the existing curb-inlet type drainage-chamber. Other pollutants contained in the first flush are readily collected from the apparatus and transferred to a selected outfall facility. The system has no moving or mechanical components and is designed to function on fluid hydraulic principles.

3 Claims, 3 Drawing Sheets

(51) Int. Cl.
  *C02F 1/00*      (2006.01)
  *E03F 5/046*     (2006.01)
  *C02F 103/00*    (2006.01)

(52) U.S. Cl.
  CPC ..... *C02F 2103/001* (2013.01); *E03F 2201/10* (2013.01)

(58) Field of Classification Search
  USPC ..... 210/162, 163, 170.03, 747.2; 404/2, 4, 5
  See application file for complete search history.

(56) References Cited

U.S. PATENT DOCUMENTS

| | | | |
|---|---|---|---|
| 4,136,010 A | | 1/1979 | Pilie |
| 4,490,067 A | | 12/1984 | Dahowski |
| 4,578,188 A | * | 3/1986 | Cousino ................... E03F 5/12 210/170.03 |
| 5,405,539 A | * | 4/1995 | Schneider ............. E03F 5/0404 210/170.03 |
| 5,529,436 A | | 6/1996 | Meyers |
| 5,674,386 A | * | 10/1997 | Filion ...................... E03F 5/12 210/162 |
| 7,083,721 B2 | * | 8/2006 | McClure ............... E03F 5/0404 210/162 |
| 9,045,874 B1 | | 6/2015 | Kondas |
| 9,127,448 B2 | | 9/2015 | Thomas |
| 9,382,701 B2 | | 7/2016 | Meyers |
| 2004/0069697 A1 | * | 4/2004 | Martinez ................ E03F 5/046 210/163 |
| 2005/0183997 A1 | * | 8/2005 | Happel ................ E03F 5/0404 210/163 |

\* cited by examiner

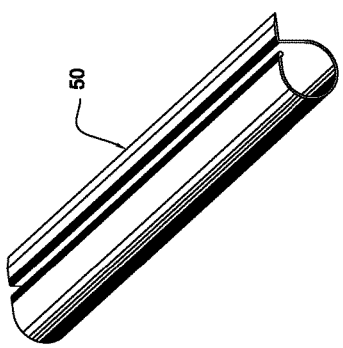
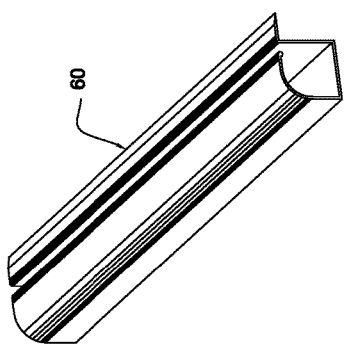
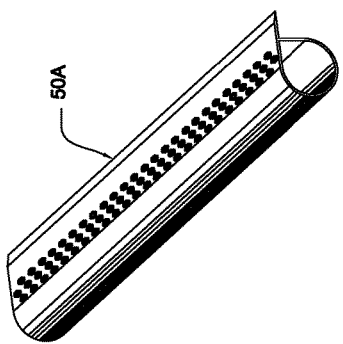
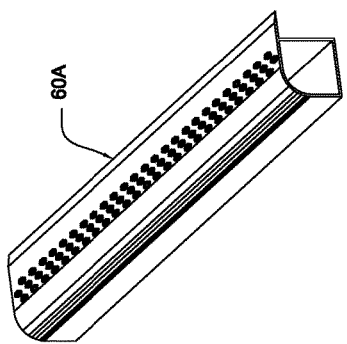
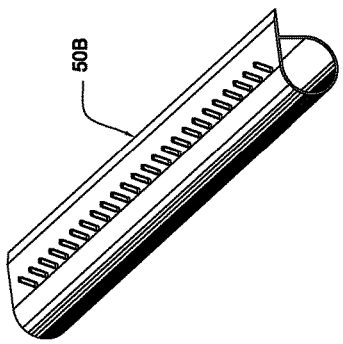
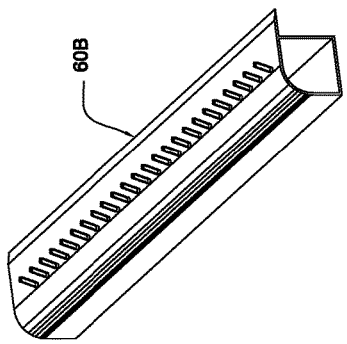
FIG 3
FIG 4

STORMWATER RUNOFF SEPARATOR AND COLLECTOR FOR CURB INLET TYPE CATCH BASINS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX (IF APPLICABLE)

Not Applicable

BACKGROUND OF THE INVENTION

Field of the Invention

This invention relates to stormwater pollutant separator and collection apparatus; and more particularly it relates to said apparatus specifically adapted in a curb-inlet subterranean drainage-chambers to separate, collect and divert polluted stormwater runoff from roadways or other impervious surfaces with inlet structures.

Background of the Invention

Stormwater is conventionally defined as runoff generated from precipitation such as rain and snow melt. In developed areas runoff flows over impervious surfaces such as parking lots, streets, rooftops and paved areas as opposed to purculating into the soil as a natural means of pollutant removal and water filtration. Urban stormwater picks up pollutants, trash, and sediment that is eventually discharged into a larger body of water such as a lake, river, the ocean, or coastal wetlands. Untreated stormwater can have detrimental impacts on receiving bodies.

In 1987, the U.S. Congress added Section-402(p) to the Federal Clean-Water Act, and established by 40-CFR part 122, part 123, and part 124;—a federal-statute requiring National Pollutant Discharge Elimination Systems (NPDES)—The National Pollutant Discharge Elimination System requires a permit for stormwater runoff discharge from municipalities and industries. The NPDES permit authorizes the discharge of stormwater and any pollutant contamination entering the stormwater conveyance system. The NPDES permit is the mechanism by which structural treatment measures known as Best Management Practices (BMP's) are required and implementation enforced.

BMP's have been developed to replicate and supplement natural pollutant removal. In general BMP's can be implemented in one of three phases, sediment and erosion control, online practice, or off line treatments. Sediment and erosion control measures are implemented upstream of a stormwater collection area as a means of containing and minimizing pollutants prior to a rainfall event. Sediment and erosion control measures include silt fences, soil stabilization blankets, and gravel check dams. An online practice is implemented as a component of the stormwater collection system. Examples of online practices include sand filters, oil separators, and catch basin insert filters. Off line treatments collect stormwater runoff and provides some treatment prior to returning the runoff to the collection system or receiving water body. BMP's are often off line practices and include retention basins and detention basins.

The initial stormwater runoff from a precipitation event is defined as the "first flush". During the first flush pollutants collected from impervious surfaces are at their highest concentration. These pollutants often enter a collection system by means of surface drains which can vary in type, application and configuration. The nomenclature of these surface drains include drainage chambers, catch basins, catch basin grates, curb inlets, and gutter inlets. Urban municipalities have recognized that stormwater pollution, particularly the first flush, is a significant environmental problem. In response many modern urban cities have begun to implement off line treatments defined as low impact development (LID). LID's aim to replicate per-development hydrology on a small scale by utilizing infiltration and vegetated assisted evaporation. LID's include bioretention basins, rain gardens bioswales and green roofs.

RELEVANT PRIOR-ART

Background research provided in this section provides a review of relevant prior patent-art apposite to this invention. Along with a brief description of said prior-art a reason is stipulated as to why the FIRST FLUSH COLLECTOR™ is a new and useful improvement.

U.S. Pat. No. 1,654,246 (filed: Apr. 9, 1926) is shown as a curb inlet type catch basin drainage device system with a grate integrated vertically into the curb to collect stormwater. This invention is designed to be installed during construction to aid in disallowing debris from entering the storm drain structure. This invention is not designed to allow for stormwater separation, or allow for a secondary outlet.

U.S. Pat. No. 1,998,514 (filed: Aug. 3, 1932) is shown as a curb inlet type catch basin drainage device with a circular pipe and riser that serves as a curb inlet. The invention is designed to outfall into a connecting subterranean structure. The device is designed as a space saving alternative to conventional catch basins. This device as designed is not intended to be retrofitted into an existing structure. This invention is not capable of separation, or providing a secondary outlet for collected flow.

U.S. Pat. No. 4,136,010 (filed: Apr. 5, 1978) is shown as a grate type catch basin drainage device system with a collection trough and a secondary collection system. This invention is designed to be used as spill containment and initial runoff collector. This invention is not designed for use with curb-inlet type basins and requires active management of build in valves to regulate the internal flows of the system.

U.S. Pat. No. 4,490,067 (filed: Dec. 17, 1981) is shown as trench drain system capable of collecting and conveying flows to a collection point. This invention is designed to be installed directly into the ground, or directly into concrete as an component of the built surface installation. This invention is not designed for use with curb-inlet type basins.

U.S. Pat. No. 5,529,436 (filed: May 11, 1994) is as a trench drain assembly capable of collecting and diverting flows. The flow collection mechanism and application are fundamentally different that the current invention. While both inventions are capable of utilizing a collection system, this device as designed is not intended to be retrofitted into an existing structure. This invention is not capable of separation, or providing a secondary outlet for collected flow.

U.S. Pat. No. 9,127,448 (filed: Dec. 3, 2012) is shown as a retrofit to an existing catch basin that allow stormwater to be directed to a adjacent treatment facility. The basic premise of the invention is to construct intake and separation basins upstream of the primary collection catch basin. While this invention allows for a retrofit to an existing basin it has to be installed adjacent to the stormwater treatment facility of outflow. This invention will require a significant construction footprint.

U.S. Pat. No. 9,382,701 (filed: Feb. 19, 2015) is shown as a linear drain assembly with a cover and a collection channel beneath. The invention is capable of intercepting, collecting, and separating storm drains flows to a secondary network if installed upstream of a primary collection structure. This invention is not designed as a retrofit solution to curb inlet type catch basins.

In full consideration of the patent review presented herein, it is determined there is a need for an improved device which these patents do not address. The newly improved storm drain separation, collection, and diversion system commercially referred to as the "FIRST FLUSH COLLECTOR™" exhibits certain major advantages as disclosed herein.

BRIEF SUMMARY OF THE INVENTION

The general field of this invention applies to road structure, process, or apparatus street, or curb inlet for surface drainage. The invention is designed to intercept stormwater runoff at a curb-inlet type drainage-chambers. Interception is accomplished in such a way as to permit excess liquid beyond the capacity of the invention, and large debris, to be directed automatically into the curb-inlet type drainage chamber in which the invention is installed. The invention can be retrofitted to an existing curb-inlet type drainage chamber, or be installed in a new curb-inlet structure. The invention facilitates a secondary outfall that can be directed to a separate drainage system, or to a stormwater best management practice (BMP) for treatment.

The objective of this invention is to provide a means of separating, collecting and diverting the most polluted, initial stormwater runoff from a precipitation event often referred to as the First Flush. The components of the invention can be retrofitted into an existing curb-inlet drainage chamber, or be installed into a new drainage chamber prior to the structure installation. A typical curb-inlet has an opening of four (4) feet to twenty (20) feet longitudinal to the roadway and five (5) inches high from the gutter pan flow path to the bottom of the chamber cover. This size of the opening allows flow during storm events but prevent large objects and debris from being carried into the chamber. The chambers are often prefabricated concrete structures typically measuring about four (4) feet wide, five (5) feet deep, and are permanently constructed as a critical infrastructure component of a roadway system or paved surface area. Other critical components of a drainage chamber include an outlet pipe which provides a means for stormwater to be conveyed to the collection system, a manhole which provides access for maintenance, and a sump to collect debris not suitable for the collection system.

It is an object of this invention to provide a cost-effective gravity-powered flow separation apparatus, adapted for retrofitting into an existing curb-inlet type drainage chamber of a stormwater collection system. Said apparatus is comprised of prefabricated sections, envisaged as circular in shape whereby the separate prefabricated sections can be placed inside the drainage-chamber confines through the drainage chamber manhole, and then readily assembled into a unified structure by a single installer person. The collection channel of the apparatus is intended to be affixed to the floor lip of the curb-inlet drainage chamber on the forward-wall portion. The other sections of the apparatus will thereafter be connected to the collection channel to comprise the complete unit.

It is an additional object of this invention to provide an overflow mechanism to prevent surface flooding in the event the apparatus is clogged.

It is an additional object of this invention to be passive in the event of a clog. The curb-inlet type drainage chamber shall continue to function as designed to divert collected stormwater.

It is a further object of this invention to provide a clean-out connection port to which a high pressure hose can be affixed to flush the apparatus of excessive debris.

BRIEF DESCRIPTION OF THE SEVERAL VIEWS OF THE DRAWING

The attributes and advantages of the invention, and other objects will become apparent from the description of the present embodiments, taken in connection with the accompanying drawings, in which:

FIG. 3. Is a perspective view of several embodiments of the slotted collection channel.

FIG. 4. Is a perspective view of several embodiments of the collection channel in a rectilinear cross sectional shape.

ITEMIZED NOMENCLATURE REFERENCES

Existing-Structure:
10—Catch Basin
11—Catch Basin Top
12—Curb
13—Roadway
14—Gutter Pan
15—Catch Basin Outlet Pipe
16—Manhole Access
17—Curb Inlet
18—Stormwater to Catch Basin
19—Stormwater to Invention
20—Stormwater to collection system/Outfall
New-Structure:
50, 50A, 50B,—Collection Channel
51—Collection Channel Tee
52—End Cap
53—Piping
54—Piping Bend
55—Overflow Tee
56—Flushing Port
57—Secondary Overflow Pipe
58—Overflow to catch basin
59—Outflow to secondary collection facility
60, 60A, 60B,—Collection Channel

DETAILED DESCRIPTION OF THE INVENTION

Figure 1:
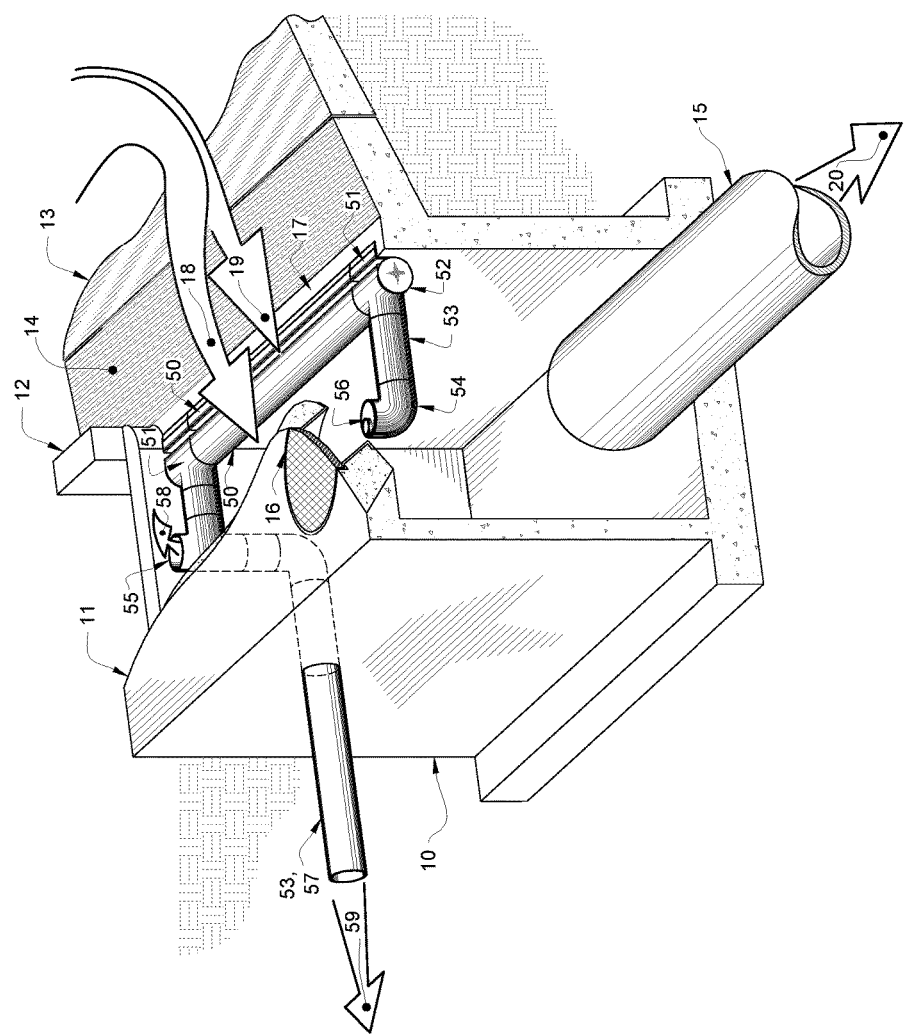
FIG. 1, is a cross-sectional perspective view of the general environment and preferred embodiment of the invention. For visual clarity a portion of the top, and right sidewall of the existing drainage chamber has been omitted.

A preferred embodiment of the invention is shown in FIG. 1 where the installation relationship between the invention, the catch basin 10, the catch basin top 11, the curb 12, and the curb inlet 17 is shown. Approaching stormwater runoff 18 and 19 flows along the roadway 13 to the gutter pan 14 to the curb inlet 17 of the catch basin 10.

The preferred embodiment of the invention shown is installed along the front wall of the catch basin 10 at the curb inlet 17. The installation location allows for hydraulic separation of flows without impediment. The initial stormwater runoff 19 flows directly to the collection channel 50. Debris and excessive stormwater 18 flows into the existing catch basin 10. The method of attaching the collection channel 50 to the catch basin 10 may vary depending on the orientation and material of the existing catch basin 10. Fasteners, and adhesives may be considered as appropriate attachment methods. Additional support brackets may be needed to secure the upstream and downstream transverse sections of the invention.

The initial stormwater runoff 19 is collected by the collection channel 50 which has at least one opening at the upstream end. On both ends of the collection channel 50 is a collection channel tee 51. Along with the end caps 52 the collection channel tee 51 comprises the portion of the invention installed along the curb inlet section 17 of the catch basin 10.

At the upstream end of the system, a flushing port 56, a bend 54, a section of piping 53, and a channel tee 52 are connected to the collection channel 50. The orientation and lengths of piping 53 are to be adjusted to allow the flushing port 56 to be accessible directly below the manhole access 16 as to allow for routine maintenance without man entry.

At the downstream end of the system connected to the collection channel tee 52 is a section of piping 53, an overflow tee 55, another section of piping 53, a bend 54, and a outflow pipe 59 for connection to a secondary collection system or stormwater management practice. The overflow tee 57 allows for overflow to the catch basin 10 in the event of a clog in the outflow pipe 57 or a clog in the system upstream of the overflow tee 55. The orientation and lengths of piping 53 are to be adjusted to allow for an appropriate outlet elevation which produces a positive flow to the desired outfall.

Figure 2:
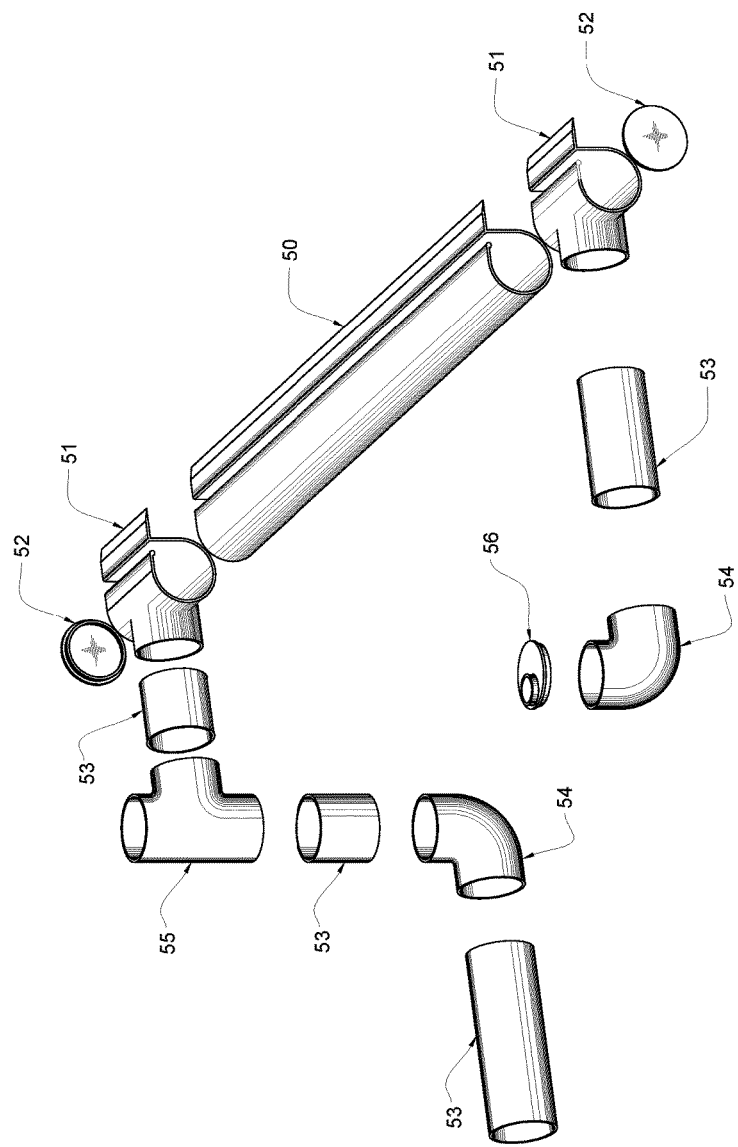
FIG. 2, is a perspective view of the exploded preferred embodiment of the invention.

An exploded view of the invention is provided in FIG. 2. Only components of the inventions are portrayed in FIG. 2. The components of the invention are shown in FIG. 2 and are in the same orientation as shown and described in FIG. 1.

Several embodiments of the collection channel 50 are shown in FIG. 3. Embodiment 50 is a single slot longitudinal to the body of the collection channel 50. Embodiment 50A show perforations in-lieu of a slot. Embodiment 50B shows multiple angled slots. Elements such as the width of the perforations/slot(s), the size of the perforations/slot(s) the shape of perforations/slot(s), and the spacing of the perforations/slot(s), can vary in the fabrication process based on the requirement of a site.

Several embodiments of the collection channel in a rectilinear cross sectional shape are shown in FIG. 4. Embodiment 60 is a single slot longitudinal to the body of the rectilinear cross sectional collection channel 60. Embodiment 60A show perforations in-lieu of a slot. Embodiment 60B shows multiple angled slots.

The preferred embodiment of the invention will be fabricated of polyvinyl chloride, high density polyethylene, other plastics, resins, or the like. The connections will be push on bell and spigot with a self locking mechanism. Each section described would be a single molding thus only requiring connections between independent members. The invention is not limited to the material of which it is fabricated. Components can be fabricated of differing materials when said material offers a distinct advantage to the prescribed application such as corrosion resistance, or extended design life. Materials including but not limited to ductile iron, stainless steel, fiber-reinforced plastic resin or the like may be used for fabrication of the invention. Use of multiple materials in a single installation may be preferable. Independent of material type hydraulic continuity and system integrity are necessary for the system to function as designed.

Although the preceding description is specific, it should not be considered as a limitation on the scope of the invention. The preferred embodiment should not be considered restrictive in nature; variations are possible. Different attachment methods, materials, dimensions, relative positions, shape and other foregoing elements can differ unless specifically indicated. The scope of the invention should be determined by the claims and their legal equivalents, not by the description provided in the preferred embodiment.

SEQUENCE LISTING

Not Applicable

The embodiments of the invention in which an exclusive property or privilege is claimed are defined as follows:

1. A system for separating, collecting and diverting the initial stormwater runoff from a precipitation event often referred to as the First Flush installed in a curb-inlet type subterranean drainage chamber of a storm drain system, comprising:
   a. A collection channel with at least one opening at the upper end for affixture on the longitudinal ledge of said curb inlet type subterranean drainage chamber adapted to the length of said curb inlet,
   b. Collection channel tees allowing transverse connections of additional extremity components,
   c. Caps at each end of the said collection channel tees installed to maintain hydraulic continuity,
   d. A flushing port in fluid communication with an upper longitudinal channel tee,
   e. An overflow tee in fluid communication with a lower longitudinal tee,
   f. An outlet pipe in fluid communication with said overflow tee, and
   g. Said outlet pipe being in fluid communication with a secondary collection facility.

2. The system of claim 1 wherein the collection channel is of any rectilinear cross sectional shape.

3. The system of claim 1 wherein said collection channel with at least one opening at the upper end is configured with:
   a. A single slot longitudinal to the body of the channel for collection,
   b. Patterned perforations for collection, or
   c. Multiple angled slots for collection.

* * * * *